US011651713B2

(12) United States Patent
Kim et al.

(10) Patent No.: US 11,651,713 B2
(45) Date of Patent: May 16, 2023

(54) FLIP DOT DISPLAY APPARATUS FOR VEHICLE (71) Applicant: HYUNDAI MOBIS CO., LTD., Seoul (KR)

(72) Inventors: Do Hyung Kim, Yongin-si (KR); Tae Kyoung Jin, Yongin-si (KR); Moo Kwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 146 days.

(21) Appl. No.: 17/221,077

(22) Filed: Apr. 2, 2021

(65) Prior Publication Data
US 2021/0312840 A1   Oct. 7, 2021

(30) Foreign Application Priority Data
Apr. 6, 2020   (KR) .......................... 10-2020-0041548

(51) Int. Cl.
*B60Q 1/50*     (2006.01)
*G09F 9/37*     (2006.01)
*B60R 19/52*    (2006.01)

(52) U.S. Cl.
CPC .............. *G09F 9/37* (2013.01); *B60Q 1/503* (2013.01); *B60Q 1/5037* (2022.05); *B60Q 1/543* (2022.05); *B60R 2019/525* (2013.01)

(58) Field of Classification Search
CPC ...... B60K 2370/1523; B60K 2370/332; B60K 2370/343; F21V 14/06
See application file for complete search history.

(56) References Cited

U.S. PATENT DOCUMENTS

| 4,914,427 | A  | * | 4/1990 | Trunk ..................... G09F 9/375 40/449 |
| 5,746,539 | A  |   | 5/1998 | Mara |
| 6,986,597 | B2 | * | 1/2006 | Elwell .................. B60Q 1/2661 362/540 |
| 10,920,950 | B1 | * | 2/2021 | Glickman ............. H05B 45/10 |
| 2005/0000126 | A1 |   | 1/2005 | Gray et al. |
| 2005/0094409 | A1 | * | 5/2005 | Elwell .................. B60Q 1/2661 362/496 |

(Continued)

FOREIGN PATENT DOCUMENTS

| KR | 10-1487904 B1 | 2/2015 | |
| WO | WO 2016/089926 | * 12/2015 | ............. B60Q 1/547 |

OTHER PUBLICATIONS

Extended European Search Report dated Sep. 2, 2021 in counterpart European Patent Application No. 21166941.1 (8 pages in English).

Primary Examiner — Zheng Song
(74) Attorney, Agent, or Firm — NSIP Law (57) ABSTRACT A flip dot display apparatus for a vehicle includes a plurality of flip dot units disposed in a front grill disposed at a front bumper of the vehicle, and configured to transfer either one or both of notice information on a state of the vehicle and notice information on driving of the vehicle to an oncoming vehicle or a pedestrian. Each flip dot unit among the plurality of flip dot units includes: a housing having an opening formed on one side thereof and a space formed therein; and a flip disk rotatably installed in the housing and configured to open or close the opening.

20 Claims, 7 Drawing Sheets (56) References Cited

U.S. PATENT DOCUMENTS

| | | | |
|---|---|---|---|
| 2015/0138807 A1* | 5/2015 | Salter | F21S 41/16 |
| | | | 362/543 |
| 2017/0210285 A1 | 7/2017 | Kobayashi et al. | |
| 2017/0246988 A1* | 8/2017 | Ihedinmah | B60Q 1/547 |
| 2019/0035264 A1* | 1/2019 | Salter | G01C 21/26 |
| 2019/0137069 A1* | 5/2019 | Glickman | F21S 45/48 |
| 2019/0256025 A1* | 8/2019 | Dickson | B60Q 1/2661 |
| 2019/0337446 A1* | 11/2019 | Salter | F21S 41/50 |
| 2021/0148535 A1* | 5/2021 | Kim | G09F 9/33 |
| 2021/0300240 A1* | 9/2021 | Takori | B60Q 1/2619 |

* cited by examiner

FLIP DOT DISPLAY APPARATUS FOR VEHICLE

CROSS-REFERENCE TO RELATED APPLICATION

This application claims the benefit under 35 U.S.C. § 119(a) of Korean Patent Application No. 10-2020-0041548 filed on Apr. 6, 2020 in the Korean Intellectual Property Office, the entire disclosure of which is incorporated herein by reference for all purposes.

BACKGROUND

Field

Exemplary embodiments of the present disclosure relate to a flip dot display apparatus for a vehicle, and more particularly, to a flip dot display apparatus for a vehicle, which is installed in a front grill of a vehicle in order to effectively transfer notice information on the state of the vehicle or notice information related to driving of the vehicle to an oncoming vehicle or pedestrian.

Discussion of the Background

With the development of autonomous driving technology, technologies related to full-scale driving of autonomous vehicles are being developed. Furthermore, research is being conducted on an apparatus and method capable of effectively transferring notice information on the state of an autonomous vehicle or notice information related to driving of the autonomous vehicle to an oncoming vehicle or pedestrian, among the technologies related to autonomous vehicles. Besides, there is a need for an apparatus and method which can display notice information related to an autonomous vehicle to the outside of the vehicle at low power more effectively, and minimize damage to a pedestrian.

The related art of the present disclosure is disclosed in Korean Patent No. 10-1487904 registered on Jan. 23, 2015 and entitled "Flip Dot Display Element using Electromagnet and Assembly Module Thereof".

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a flip dot display apparatus for a vehicle includes a plurality of flip dot units disposed in a front grill disposed at a front bumper of the vehicle, and configured to transfer either one or both of notice information on a state of the vehicle and notice information on driving of the vehicle to an oncoming vehicle or a pedestrian. Each flip dot unit among the plurality of flip dot units includes: a housing having an opening formed on one side thereof and a space formed therein; and a flip disk rotatably installed in the housing and configured to open or close the opening.

The flip disk may have a front surface and a rear surface. The front surface and the rear surface may have different respective colors, such that color inversion occurs when the flip disk is rotated.

At least one flip dot unit, among the plurality of flip dot units may further include a light source member disposed in the housing, and configured to emit light illuminating the space of the housing.

The housing may include: a first side portion having the light source member installed thereon; a second side portion extended from the first side portion, and configured to form the space with the first side portion; and a third side portion extended from the second side portion, disposed to face the first side portion, and having the flip disk installed thereon.

The flip disk may be configured to rotate about a rotation axis passing through a center of the third side portion. The light source member may be disposed on the first side portion and blocked by the flip disk such that the light emitted from the light source member is not directly exposed to an outside of the housing.

The light source member may be disposed in a center of the first side portion.

The flip disk may have a symmetrical shape with respect to the rotation axis.

Each flip dot unit among the plurality of flip dot units may further include a light source member disposed in the housing, and configured to emit light illuminating the space of the housing.

The plurality of flip dot units may be arranged in two or more rows in a horizontal direction of the front grill. One or more light source members may be disposed at each of the two or more rows where the plurality of flip dot units are arranged, and may be configured to emit light illuminating the space of the housing.

The plurality of flip dot units may be arranged in two or more columns in a vertical direction of the front grill. One or more light source members may be disposed at each of the two or more columns where the flip dot units are arranged, and may be configured to emit light illuminating the space of the housing.

At least one flip dot unit, among the plurality of flip dot units, may further include a light source member disposed in the housing, and configured to emit light illuminating the space of the housing. The flip dot display apparatus may further include: a sensor unit disposed in the front grill, and configured to sense the pedestrian; and a control unit configured to transmit a flip disk operating signal and a light source member turn-on signal to the at least one flip dot unit. The flip disk operating signal may be operable to rotate the flip disk, and the light source member turn-on signal may be operable to turn on the light source member.

The control unit may be further configured to transmit the flip disk operating signal and the light source member turn-on signal to the at least one flip dot unit, in response to a pedestrian being sensed by the sensor unit, such that a character or sign is displayed to call attention to the pedestrian.

The control unit may be further configured to transmit the flip disk operating signal and the light source member turn-on signal at a same time.

At least one flip dot unit, among the plurality of flip dot units, may further include a light source member disposed in the housing, and configured to emit light illuminating the space of the housing. The flip dot display apparatus may further include: a pair of sensor units disposed on the left and right sides of the front grill, respectively; and a control unit configured to transmit a flip disk operating signal and a light source member turn-on signal to the at least one flip dot unit. The flip disk operating signal may be operable to rotate the flip disk, and the light source member turn-on signal may be operable to turn on the light source member.

The control unit may be further configured to transmit the flip disk operating signal and the light source member turn-on signal to the at least one flip dot unit, in response to the pedestrian being sensed by the sensor unit, such that a character or sign is displayed to call attention to the pedestrian.

The control unit may be further configured to transmit the flip disk operating signal and the light source member turn-on signal at a same time.

The flip disk may be further configured to open the opening by different opening degrees.

Each flip dot unit among the plurality of flip dot units may further include a light source member disposed in the housing, and configured to emit light. The flip dot display apparatus may further include a control unit configured to vary an amount of the light exposed through the opening by controlling rotation of the flip disk to open the opening by different opening degrees.

Other features and aspects will be apparent from the following detailed description, the drawings, and the claims.

DETAILED DESCRIPTION OF THE ILLUSTRATED EMBODIMENTS

Hereinafter, a flip dot display apparatus for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
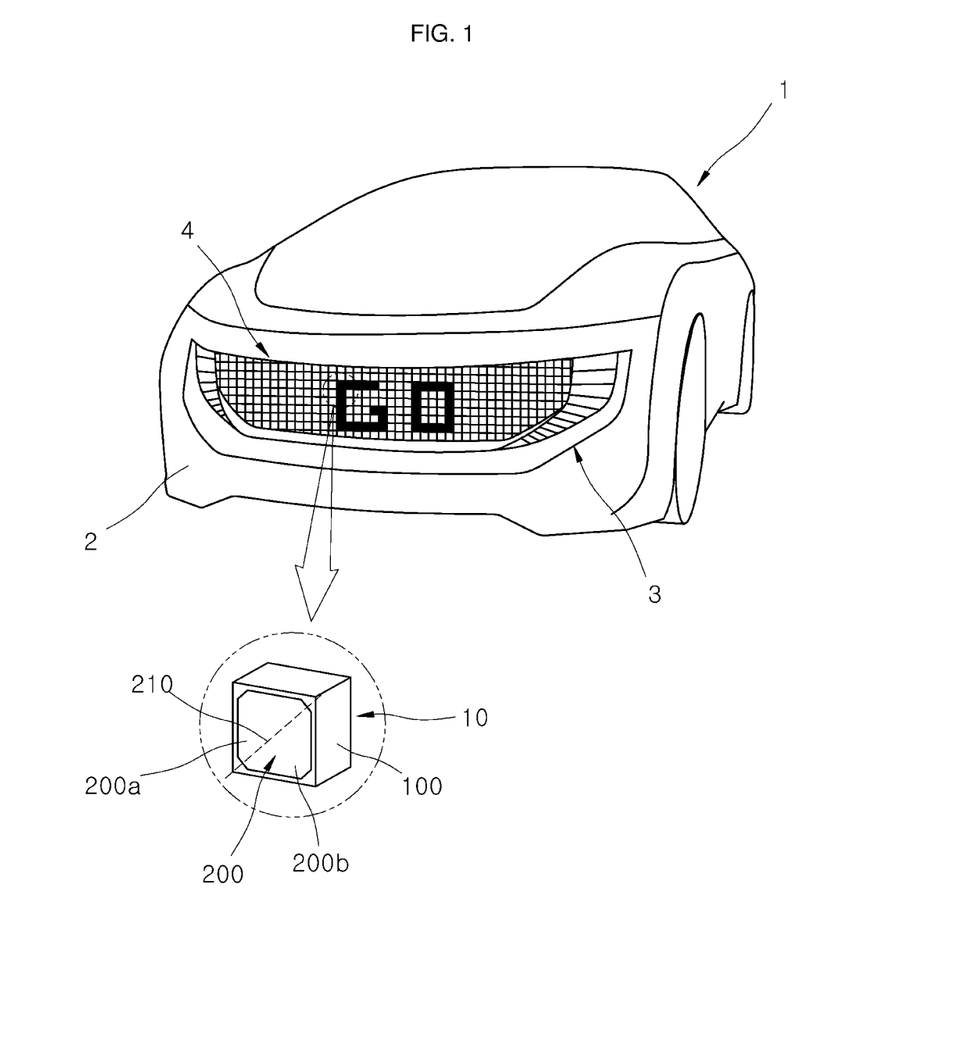
FIG. 1 is a diagram illustrating a vehicle in which a flip dot display apparatus for a vehicle in accordance with an embodiment of the present disclosure is installed.
Figure 2:
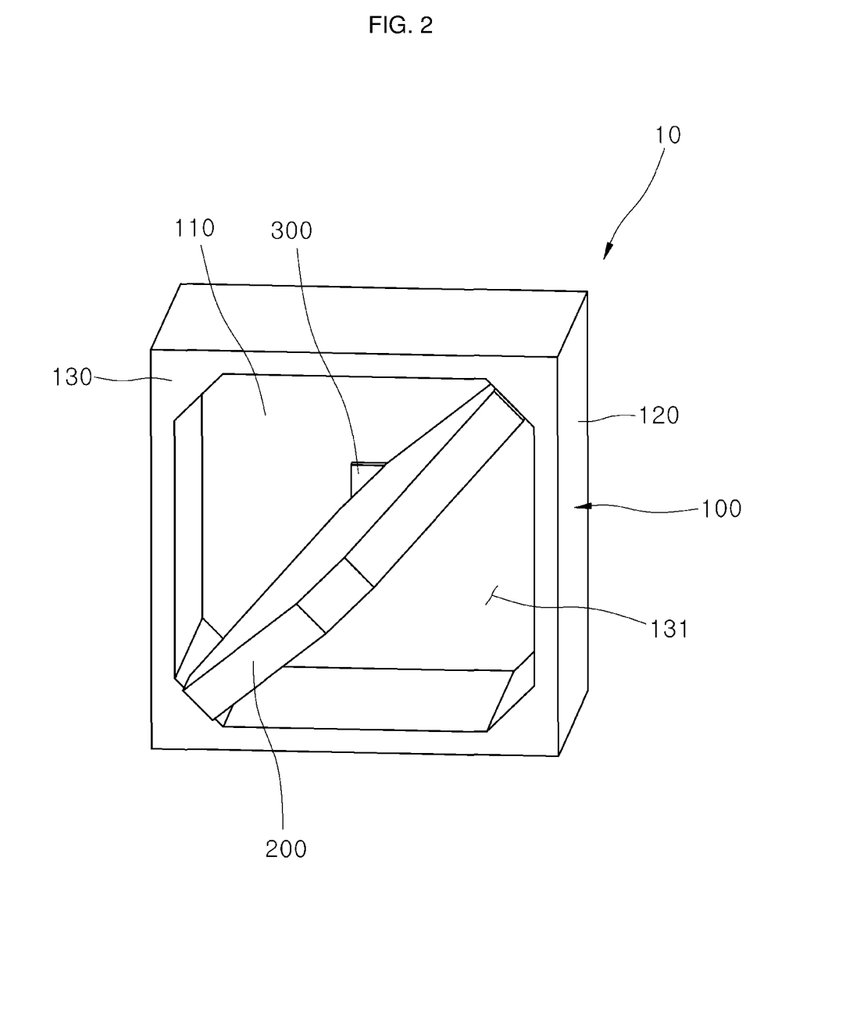
FIG. 2 is a diagram illustrating a flip dot unit applied to the flip dot display apparatus for a vehicle in accordance with the embodiment of the present disclosure.
Figure 3:
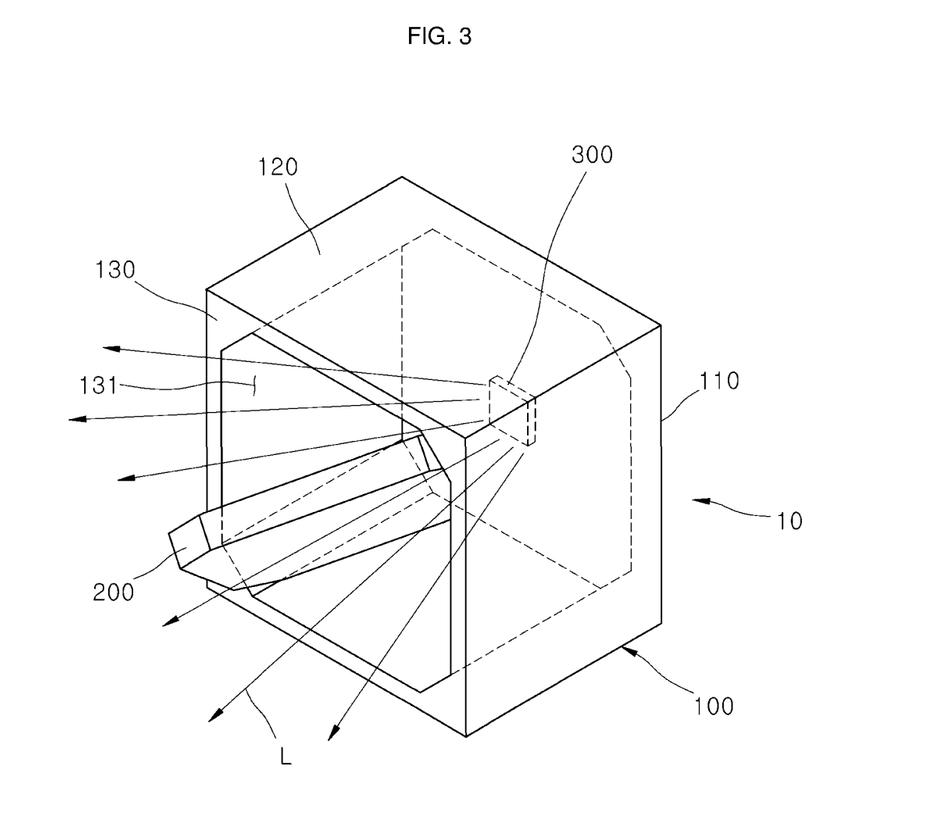
FIG. 3 is a diagram illustrating how light is emitted from a light source member of the flip dot unit applied to the flip dot display apparatus for a vehicle in accordance with the embodiment of the present disclosure.
Figure 4:
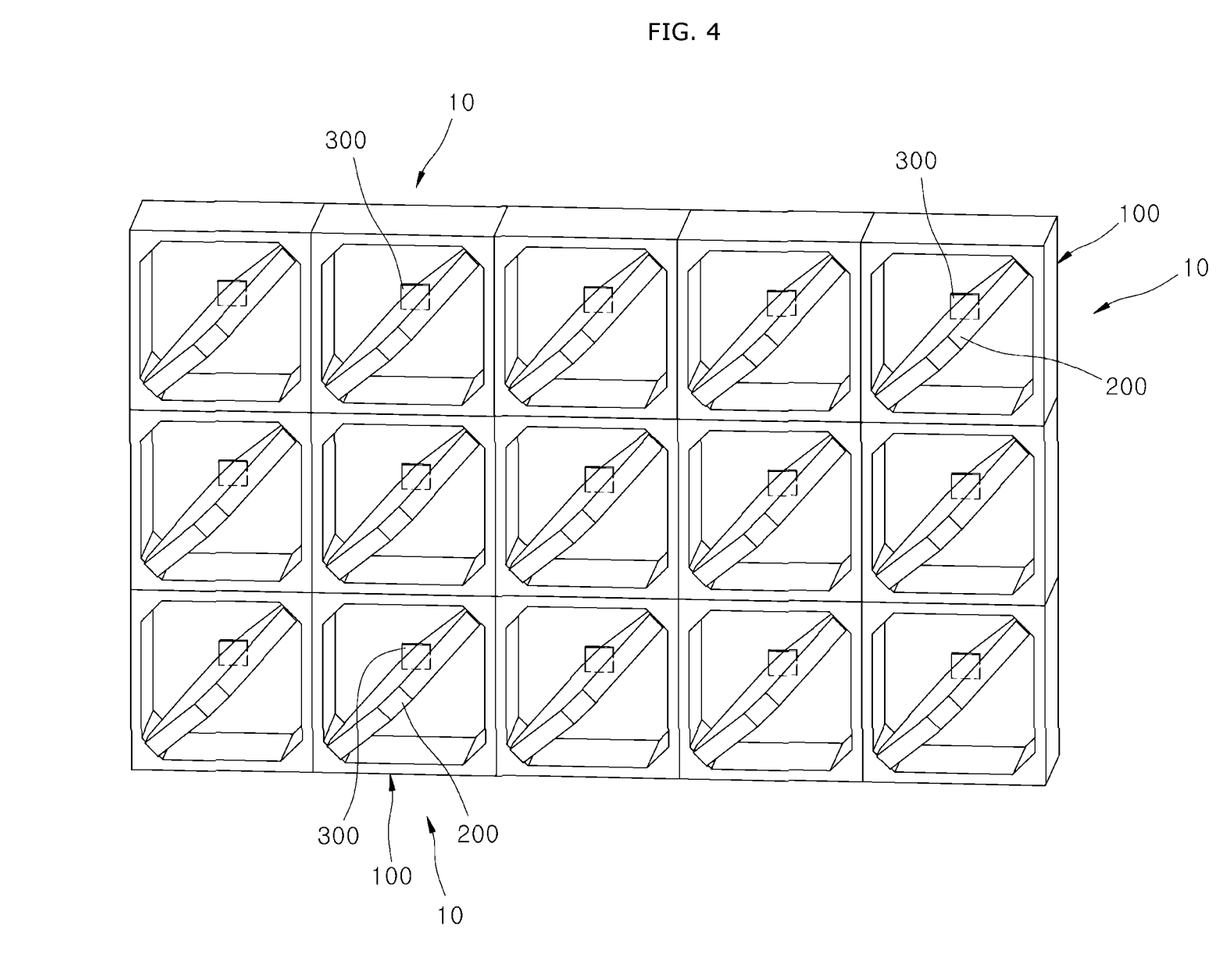
FIG. 4 is a diagram illustrating a first embodiment for an arrangement of light source members installed in the flip dot units applied to the flip dot display apparatus for a vehicle in accordance with the embodiment of the present disclosure.
Figure 5:
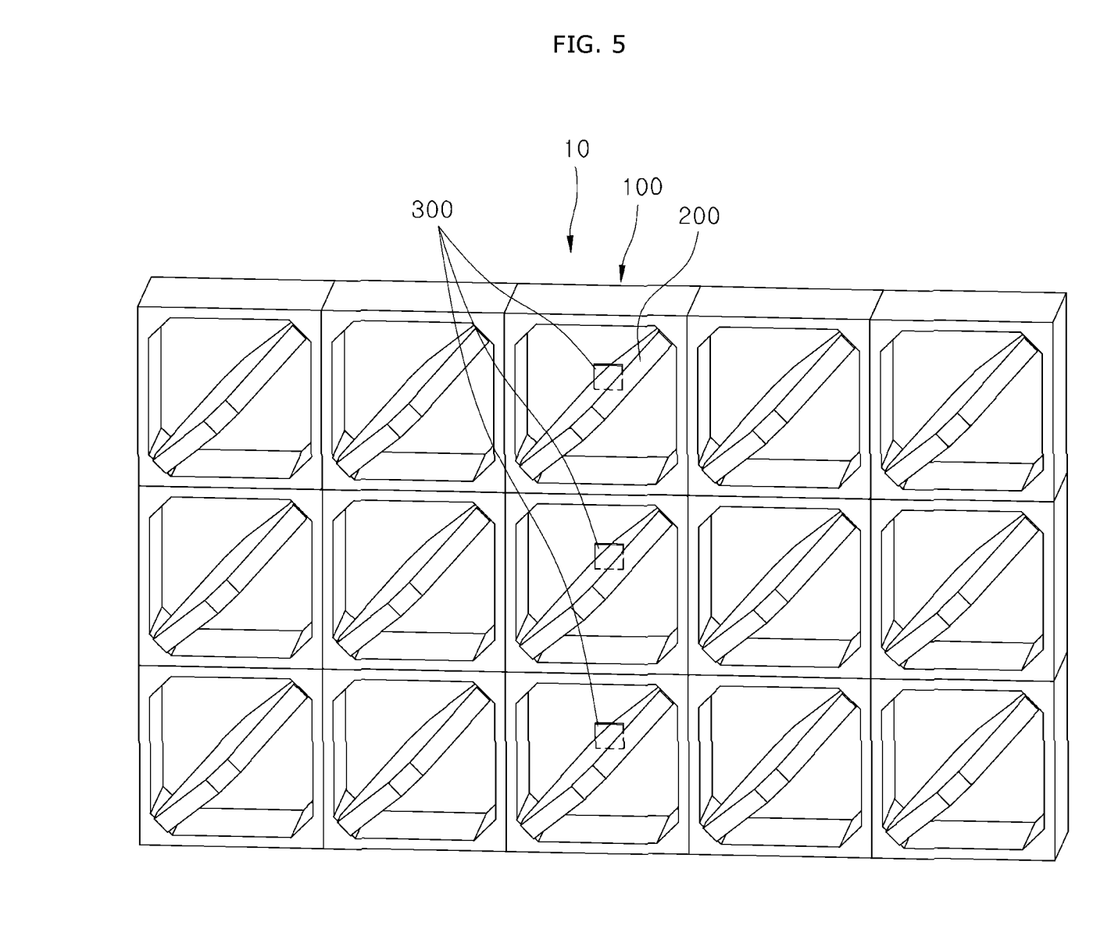
FIG. 5 is a diagram illustrating a second embodiment for the arrangement of the light source members installed in the flip dot units applied to the flip dot display apparatus for a vehicle in accordance with the embodiment of the present disclosure.
Figure 6:
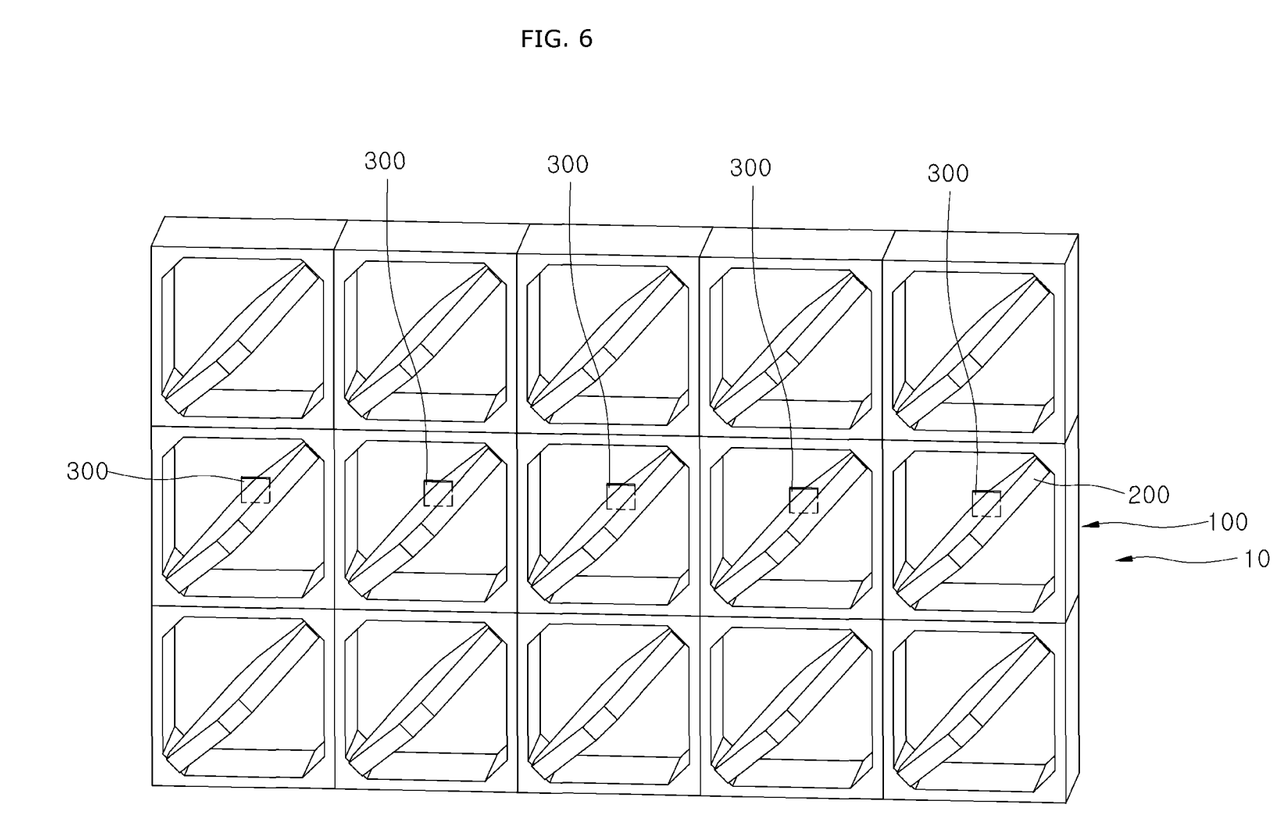
FIG. 6 is a diagram illustrating a third embodiment for the arrangement of the light source members installed in the flip dot units applied to the flip dot display apparatus for a vehicle in accordance with the embodiment of the present disclosure.
Figure 7:
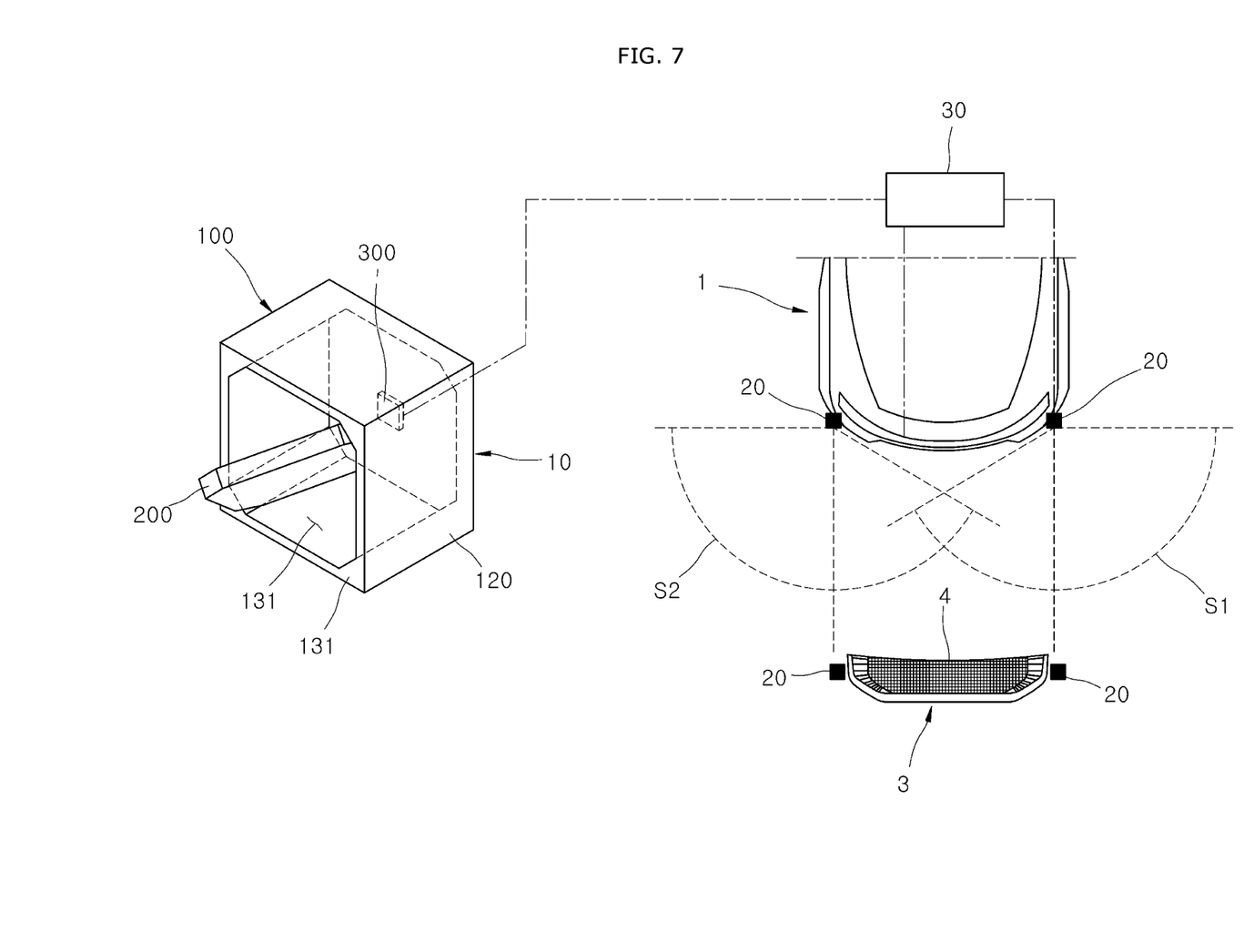
FIG. 7 is a diagram illustrating the entire configuration of the flip dot display apparatus for a vehicle in accordance with the embodiment of the present disclosure.

FIG. 1 is a diagram illustrating a vehicle in which a flip dot display apparatus for a vehicle in accordance with an embodiment of the present disclosure is installed, FIG. 2 is a diagram illustrating a flip dot unit applied to the flip dot display apparatus for a vehicle in accordance with the embodiment of the present disclosure, FIG. 3 is a diagram illustrating how light is emitted from a light source member of the flip dot unit applied to the flip dot display apparatus for a vehicle in accordance with the embodiment of the present disclosure, FIG. 4 is a diagram illustrating a first embodiment for an arrangement of light source members installed in the flip dot units applied to the flip dot display apparatus for a vehicle in accordance with the embodiment of the present disclosure, FIG. 5 is a diagram illustrating a second embodiment for the arrangement of the light source members installed in the flip dot units applied to the flip dot display apparatus for a vehicle in accordance with the embodiment of the present disclosure, FIG. 6 is a diagram illustrating a third embodiment for the arrangement of the light source members installed in the flip dot units applied to the flip dot display apparatus for a vehicle in accordance with the embodiment of the present disclosure, and FIG. 7 is a diagram illustrating the entire configuration of the flip dot display apparatus for a vehicle in accordance with the embodiment of the present disclosure.

FIG. 1 illustrates a vehicle 1 in which a flip dot display apparatus 4 for a vehicle in accordance with the embodiment of the present disclosure is installed, and the flip dot display apparatus 4 for a vehicle in accordance with the embodiment of the present disclosure is installed in a front grill 3 provided at a front bumper 2 of the vehicle 1. The flip dot display apparatus 4 for a vehicle visualizes and displays, as figures, characters or signs, notice information on the state of the vehicle 1 or notice information related to driving of the vehicle 1, thereby calling an oncoming vehicle or pedestrian's attention.

The notice information on the state of the vehicle 1 includes information obtained by visualizing whether the vehicle 1 was turned on/off or whether the vehicle 1 is being stopped or driving. The notice information related to driving of the vehicle 1 includes information obtained by visualizing acceleration and deceleration or direction change of the vehicle 1.

The flip dot display apparatus 4 for a vehicle in accordance with the embodiment of the present disclosure may include a plurality of flip dot units 10, and further include a sensor unit 20 and a control unit 30. Each of the flip dot units 10 works like a pixel of a general display apparatus.

Each of the flip dot units 10 applied to the flip dot display apparatus 4 for a vehicle in accordance with the embodiment of the present disclosure includes a housing 100, a flip disk 200 and a light source member 300.

The housing 100 is formed in an approximately hexahedron shape as a whole, and has an opening 131 formed on one side thereof and a space formed therein. The housing 100 has a hexahedron shape when the opening 131 is closed by the flip disk 200.

The housing 100 includes a first side portion 110, a second side portion 120 and a third side portion 130. The first side portion 110 is formed in a rectangular plate shape and has the light source member 300 installed thereon. The second side portion 120 is bent and extended from the first side portion 110 so as to have a rectangular pipe shape, and forms the space with the first side portion 110. The third side portion 130 is bent and extended from the second side portion 120 and disposed to face the first side portion 110, and has the opening 131 formed therein.

The flip disk 200 is also referred to as a flip dot, and formed in a polygonal or circular plate shape. The flip disk 200 is rotatably installed on the third side portion 130 of the housing 100 so as to open or close the opening 131 formed at the third side portion 130 of the housing 100.

The front and rear surfaces of the flip disk 200 may have different colors. The flip disk 200 may implement a pixel through rotation, and thus transfer the notice information on the state of the vehicle 1 or the notice information related to driving of the vehicle 1 through color inversion of the flip disk 200 even without light emission of the light source member 300, in the daytime.

The color inversion of the flip disk 200 may be achieved by applying different colors to the front and rear surfaces of the flip disk 200. That is, when the front surface of the flip disk 200 has blue color and the rear surface thereof has white color, the flip disk 200 may be only rotated to achieve color inversion from blue to white or from white to blue.

The light source member 300 is installed in the housing 100, and emits light into the space of the housing 100. As the light source member 300, an LED device to emit bright light with low power may be used.

The flip disk 200 may be rotated by an electromagnetic actuator (not illustrated).

When the flip disk 200 is disposed to close the opening 131, the light emitted from the light source member 300 is blocked by the flip disk 200 so as not to be emitted to the outside of the housing 100.

When the flip disk 200 is rotated, the opening 131 may be opened. According to the rotation angle of the flip disk 200, the opening degree of the opening 131 and the amount of light exposed through the opening 131 may be changed.

Therefore, the flip dot display apparatus 4 for a vehicle, constituted by the plurality of flip dot units 10, may visualize and display various figures, characters or signs such as a direction change arrow more brightly and more clearly in the nighttime, by using a change in the amount of light exposed through the opening 131 of the housing 100 at the moment that the flip disks 200 are rotated, thereby improving visibility in the nighttime.

The flip disk 200 is installed to rotate about a rotation axis 210 passing through the center of the third side portion, and the light source member 300 may be installed in the center of the first side portion 110 and thus blocked by the flip disk 200 such that light emitted from the light source member 300 is not directly exposed to the outside of the housing 100.

The flip disk 200 has a symmetrical shape with respect to the rotation axis 210. Therefore, a first configuration 200a located on one side of the rotation axis 210 and a second configuration 200b located on the other side of the rotation axis 210 have the same shape and cross-sectional area.

FIG. 4 illustrates a first embodiment for an arrangement of the light source members 300 installed in the flip dot units 10 applied to the flip dot display apparatus 4 for a vehicle in accordance with the embodiment of the present disclosure.

As illustrated in FIG. 4, the light source members 300 may be installed in the plurality of flip dot units 10, respectively. In this case, a larger amount of light may be emitted to transfer visualized and displayed figures, characters or signs more clearly to a long distance, but power consumption may be increased.

FIG. 5 illustrates a second embodiment for the arrangement of the light source members 300 installed in the flip dot units 10 applied to the flip dot display apparatus 4 for a vehicle in accordance with the embodiment of the present disclosure.

As illustrated in FIG. 5, the plurality of flip dot units 10 may be arranged in two or more rows in the horizontal direction of the front grill 3 (see FIGS. 1 and 7), and one or more light source members 300 may be installed at each of the rows where the flip dot units 10 are arranged.

In this case, the spaces of the flip dot units 10 disposed at each row may communicate with each other, such that two or more flip dot units 10 can share light emitted by the light source member 300.

FIG. 6 illustrates a third embodiment for the arrangement of the light source members 300 installed in the flip dot units 10 applied to the flip dot display apparatus 4 for a vehicle in accordance with the embodiment of the present disclosure.

As illustrated in FIG. 6, the plurality of flip dot units 10 may be arranged in two or more columns in the vertical direction of the front grill 3 (see FIGS. 1 and 7), and one or more light source members 300 may be installed at each of the columns where the flip dot units 10 are arranged.

In this case, the spaces of the flip dot units 10 disposed at each column may communicate with each other, such that two or more flip dot units 10 can share light emitted by the light source member 300.

As illustrated in FIG. 7, the flip dot display apparatus 4 for a vehicle in accordance with the embodiment of the present disclosure may further include a pair of sensor units 20 and a control unit 30.

The pair of sensor units 20 are installed at the front bumper 2 of the vehicle 1, and disposed on the left and right sides of the front grill 3, respectively, so as to sense pedestrians. The pair of sensor units 20 sense pedestrians entering first and second sensing regions S1 and S2. When a pedestrian is sensed, the sensor unit 20 transmits a pedestrian sensing signal to the control unit 30.

The control unit 30 receives the pedestrian sensing signal from the sensor unit 20, and transmits a flip disk operating signal and a light source member turn-on signal to the flip dot unit 10. The flip disk operating signal is applied to rotate the flip disk 200, and the light source member turn-on signal is applied to turn on the light source member 300.

The control unit 30 transmits the flip disk operating signal and the light source member turn-on signal at the same time, thereby minimizing an energy loss by the turn-on of the light source member 300.

When a pedestrian is sensed by the sensor unit 20, the control unit 30 may transmit the flip disk operating signal and the light source member turn-on signal to the flip dot unit 10 at the same time, such that figures, characters or signs for calling attention to the pedestrian are displayed.

When the opening 131 of the flip dot unit 10 is closed by the flip disk 200, the control unit 30 may turn off the light source member 300. In this case, the power consumption of the vehicle 1 may be reduced.

As described above, the flip dot display apparatus for a vehicle in accordance with the embodiment of the present disclosure can effectively transfer the notice information on the state of the vehicle or the notice information related to driving of the vehicle to an oncoming vehicle or pedestrian.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A flip dot display apparatus for a vehicle, comprising:
a plurality of flip dot units disposed in a front grill disposed at a front bumper of the vehicle, and configured to transfer either one or both of notice information on a state of the vehicle and notice information on driving of the vehicle to an oncoming vehicle or a pedestrian,
wherein each flip dot unit, among the plurality of flip dot units, comprises:
a housing having an opening formed on one side of the housing and a space formed within the housing; and
a flip disk rotatably installed with respect to the opening of the housing to open and close the opening to respectively expose and not expose the space to an exterior of the housing.

2. The flip dot display apparatus of claim 1, wherein the flip disk has a front surface and a rear surface, and
wherein the front surface and the rear surface have different respective colors, such that color inversion occurs when the flip disk is rotated, to open the opening, from being closed with the front surface outward facing, and close the opening with the rear surface outward facing.

3. The flip dot display apparatus of claim 2, wherein at least one flip dot unit, among the plurality of flip dot units, further comprises a light source member disposed in the housing, and configured to emit light illuminating the space of the housing.

4. The flip dot display apparatus of claim 3, wherein the housing comprises:
a first side portion having the light source member installed thereon;
a second side portion extended from the first side portion, and configured to form the space with the first side portion; and
a third side portion extended from the second side portion, disposed to face the first side portion, and having the flip disk installed thereon.

5. The flip dot display apparatus of claim 4, wherein the flip disk is configured to rotate about a rotation axis passing through a center of the third side portion, and
wherein the light source member is disposed on the first side portion and blocked by the flip disk such that the light emitted from the light source member is not directly exposed to an outside of the housing.

6. The flip dot display apparatus of claim 5, wherein the light source member is disposed in a center of the first side portion.

7. The flip dot display apparatus of claim 6, wherein the flip disk has a symmetrical shape with respect to the rotation axis.

8. The flip dot display apparatus of claim 7, wherein the plurality of flip dot units are arranged in two or more columns in a vertical direction of the front grill, and
wherein one or more light source members are disposed at each of the two or more columns where the flip dot units are arranged, and are configured to emit light illuminating the space of the housing.

9. The flip dot display apparatus of claim 2, wherein each of the plurality of flip dot units further comprises a light source member disposed in the housing, and configured to emit light illuminating the space of the housing.

10. The flip dot display apparatus of claim 2, wherein the plurality of flip dot units are arranged in two or more rows in a horizontal direction of the front grill, and
wherein one or more light source members are disposed at each of the two or more rows where the plurality of flip dot units are arranged, and are configured to emit light illuminating the space of the housing.

11. The flip dot display apparatus of claim 1, wherein the flip disk is further configured to open the opening by different opening degrees.

12. The flip dot display apparatus of claim 1, wherein each flip dot unit among the plurality of flip dot units further comprises a light source member disposed in the housing, and configured to emit light, and
wherein the flip dot display apparatus further comprises a control unit configured to vary an amount of the light exposed through the opening by controlling rotation of the flip disk to open the opening by different opening degrees.

13. The flip dot display apparatus of claim 1, wherein at least one flip dot unit, among the plurality of flip dot units, further comprises a light source member disposed in the housing, and configured to emit light illuminating the space of the housing,
wherein the flip dot display apparatus further comprises:
a sensor unit disposed in the front grill, and configured to sense the pedestrian; and
a control unit configured to transmit a flip disk operating signal and a light source member turn-on signal to the at least one flip dot unit, and
wherein the flip disk operating signal is operable to rotate the flip disk, and the light source member turn-on signal is operable to turn on the light source member.

14. The flip dot display apparatus of claim 1, wherein at least one flip dot unit, among the plurality of flip dot units, further comprises a light source member disposed in the housing, and configured to emit light illuminating the space of the housing,
wherein the flip dot display apparatus further comprises:
a pair of sensor units disposed on the left and right sides of the front grill, respectively; and
a control unit configured to transmit a flip disk operating signal and a light source member turn-on signal to the at least one flip dot unit, and
wherein the flip disk operating signal is operable to rotate the flip disk, and the light source member turn-on signal is operable to turn on the light source member.

15. A flip dot display apparatus for a vehicle, comprising:
a plurality of flip dot units disposed in a front grill disposed at a front bumper of the vehicle, and configured to transfer either one or both of notice information on a state of the vehicle and notice information on driving of the vehicle to an oncoming vehicle or a pedestrian,
wherein each flip dot unit, among the plurality of flip dot units, comprises:
a housing having an opening formed on one side of the housing and a space formed within the housing; and
a flip disk rotatably installed in the housing and configured to open or close the opening, wherein at least one flip dot unit, among the plurality of flip dot units, further comprises a light source member disposed in the housing, and configured to emit light illuminating the space of the housing,
wherein the flip dot display apparatus further comprises:
a sensor unit disposed in the front grill, and configured to sense the pedestrian; and
a control unit configured to transmit a flip disk operating signal and a light source member turn-on signal to the at least one flip dot unit, and wherein the flip disk operating signal is operable to rotate the flip disk, and the light source member turn-on signal is operable to turn on the light source member.

16. The flip dot display apparatus of claim 15, wherein the control unit is further configured to transmit the flip disk operating signal and the light source member turn-on signal to the at least one flip dot unit, in response to a pedestrian being sensed by the sensor unit, such that a character or sign is displayed to call attention to the pedestrian.

17. The flip dot display apparatus of claim 15, wherein the control unit is further configured to transmit the flip disk operating signal and the light source member turn-on signal at a same time.

18. A flip dot display apparatus for a vehicle, comprising:
a plurality of flip dot units disposed in a front grill disposed at a front bumper of the vehicle, and configured to transfer either one or both of notice information on a state of the vehicle and notice information on driving of the vehicle to an oncoming vehicle or a pedestrian,
wherein each flip dot unit, among the plurality of flip dot units, comprises:
a housing having an opening formed on one side of the housing and a space formed within the housing; and
a flip disk rotatably installed in the housing and configured to open or close the opening, wherein at least one flip dot unit, among the plurality of flip dot units, further comprises a light source member disposed in the housing, and configured to emit light illuminating the space of the housing,
wherein the flip dot display apparatus further comprises:
a pair of sensor units disposed on the left and right sides of the front grill, respectively; and
a control unit configured to transmit a flip disk operating signal and a light source member turn-on signal to the at least one flip dot unit, and
wherein the flip disk operating signal is operable to rotate the flip disk, and the light source member turn-on signal is operable to turn on the light source member.

19. The flip dot display apparatus of claim 18, wherein the control unit is further configured to transmit the flip disk operating signal and the light source member turn-on signal to the at least one flip dot unit, in response to the pedestrian being sensed by the sensor unit, such that a character or sign is displayed to call attention to the pedestrian.

20. The flip dot display apparatus of claim 18, wherein the control unit is further configured to transmit the flip disk operating signal and the light source member turn-on signal at a same time.

* * * * *